United States Patent
Horii et al.

(10) Patent No.: US 7,472,988 B2
(45) Date of Patent: Jan. 6, 2009

(54) METHOD FOR TREATING INKJET LIQUID, RECORDING APPARATUS USING THE SAME, LIQUID STORAGE TANK, LIQUID ABSORBER FOR LIQUID STORAGE AND LIQUID TREATMENT APPARATUS

(75) Inventors: Kyoko Horii, Kanagawa (JP); Yoshiro Yamashita, Kanagawa (JP); Eisuke Hiraoka, Kanagawa (JP); Toshitake Yui, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/848,712

(22) Filed: Aug. 31, 2007

(65) Prior Publication Data

US 2008/0055372 A1 Mar. 6, 2008

Related U.S. Application Data

(62) Division of application No. 10/921,354, filed on Aug. 19, 2004, now Pat. No. 7,278,724.

(30) Foreign Application Priority Data

Aug. 20, 2003 (JP) .............................. 2003-295926

(51) Int. Cl.
*G01D 11/00* (2006.01)
(52) U.S. Cl. .............................. 347/95; 347/85; 347/100
(58) Field of Classification Search ................. 347/100, 347/95, 96, 101, 29, 31, 30, 32
See application file for complete search history.

(56) References Cited

U.S. PATENT DOCUMENTS

| | | | | |
|---|---|---|---|---|
| 5,329,306 | A | * | 7/1994 | Carlotta ........................ 347/90 |
| 5,900,899 | A | | 5/1999 | Ichizawa et al. |
| 6,425,662 | B1 | * | 7/2002 | Teraoka et al. ............... 347/100 |
| 2004/0125154 | A1 | * | 7/2004 | Cheney et al. ................. 346/35 |
| 2005/0012796 | A1 | | 1/2005 | Doi et al. |

FOREIGN PATENT DOCUMENTS

| | | |
|---|---|---|
| JP | A-56-60256 | 5/1981 |
| JP | A-57-12655 | 1/1982 |
| JP | A-62-113556 | 5/1987 |
| JP | A-62-251146 | 10/1987 |
| JP | A-63-295265 | 12/1988 |
| JP | A-6-106735 | 4/1994 |
| JP | A-10-272768 | 10/1998 |

* cited by examiner

*Primary Examiner*—Manish S Shah
(74) *Attorney, Agent, or Firm*—Morgan, Lewis & Bockius LLP

(57) ABSTRACT

The present invention relates to a method for treating liquids used in inkjet recording including, providing a first printing liquid and a second printing liquid that is capable of reacting with the first printing liquid to cause coagulation and thickening if mixed with the first printing liquid, and exposing the first and second printing liquids to each other to form a mixture, wherein when the mixture includes a coagulation-thickening preventing agent which prevents the reaction of the printing liquids.

14 Claims, No Drawings

METHOD FOR TREATING INKJET LIQUID, RECORDING APPARATUS USING THE SAME, LIQUID STORAGE TANK, LIQUID ABSORBER FOR LIQUID STORAGE AND LIQUID TREATMENT APPARATUS

CROSS-REFERENCE TO RELATED APPLICATION

The present application is a divisional application of U.S. application Ser. No. 10/921,354, filed Aug. 19, 2004, now U.S. Pat. No. 7,278,724 which claims the benefit of Japanese Application No. 2003-295926, filed Aug. 20, 2003, both of which are incorporated herein by reference in their entireties.

BACKGROUND OF THE INVENTION

1. Field of the Invention The present invention relates to a method of treating an inkjet liquid (printing liquid) such as an ink or a processing liquid used in printing with an inkjet recording apparatus. Further, the invention relates to an inkjet recording apparatus, an inkjet liquid storage tank, and liquid absorber for inkjet liquid storage and an inkjet liquid treatment apparatus using the method.

2. Description of the Related Art

In inkjet recording methods, a liquid or melt solid ink is fired from nozzles, slits, porous films and the like, to perform recording on paper, cloth, film and the like. These methods have features of small size, low cost and silence and are used in a lot of printers. Among them, a piezo inkjet method of firing a liquid ink from a nozzle utilizing deformation of a piezoelectric element and a heat inkjet method which utilizes a heat boiling phenomenon are excellent in resolution and printing speed. Therefore, these methods are frequently utilized.

Inkjet recording is a promising recording technology as described above, however, it has a problem of poor discharge of ink. There are various causes for poor discharge, and drying and thickening of an ink in a nozzle, and clogging of a nozzle with bubble, refuse and the like can be exemplified. As technologies developed for solving such problems, a technology of covering a nozzle with a cap during non-printing period, a technology of providing a suction apparatus for discharging thickened inks, bubbles and refuses, a technology of empty firing, so-called dummy jet, and the like, can be exemplified. Among suggested technologies are technologies of providing an ink suction mechanism (see, Japanese Patent Application Laid-Open (JP-A) Nos. 56-60256, 57-12655, 62-113556 and 63-295265) and a technology of wiping off an ink adhered on the end surface of a head body by a wiper member (JP-A No. 62-251146). Owing to development of such technologies, improvement in poor discharge has been tried.

On the other hand, it has been recently desired to print at high speed and with high image quality particularly on regular paper. Therefore, various methods have been suggested to improve image density and to improve bleed of a single color and inter-color bleed. In a method suggested in JP-A No. 6-106735, in an ink set, color inks contains a surfactant that promotes permeation, and a solvent and salt, and the black ink contains a component causing thickening or coagulation under an influence of a salt. In a method suggested in JP-A No. 10-272768, pH of a color ink is 5 or lower, coagulation of a black ink is caused by contact of a black ink having weak ion strength with a color ink having strong ion strength, to improve water resistance and inter-color bleed. Examples of the compound enhancing the ion strength of a color ink in this method include monovalent and polyvalent chlorides, fluorides, bromides, nitrates and tosylates of alkali metals and alkaline earth metals.

However, when components thus causing coagulation are used in inks and processing liquids, in the maintenance part including a disposal apparatus that disposes of an ink and processing liquid, it is necessary to dispose of inks and processing liquids separately if the inks and the processing liquids cause coagulation and thickening when mixed. Consequently, an inkjet recording apparatus becomes larger and the cost increases.

There is a maintenance part that fires inks and processing liquids from each nozzle immediately before formation of an image (dummy jet) and prevent the discharge at the formation of an image from becoming faulty. There is also a method in which a cap is provided on each head to prevent drying of inks and processing liquids in a nozzle part, and the inks and the processing liquids are sucked by a pump while the nozzles are capped, to remove from a nozzle inks and processing liquids that were thickened when they dried. In these example, usually, a waste liquid composed of inks and processing liquids generated during maintenance is recovered through a tube to a waste ink tank that stores a waste liquid. In many cases, in the waste ink tank, a porous body such as urethane foam or a fibrous material such as polyester felt is used as an absorber, and this absorber absorbs the waste liquid composed of inks and processing liquids.

If the inks and the processing liquid which coagulate or thicken when mixed are mixed and disposed of in a part of disposal device in such a maintenance section, a problem occurs. For example, clogging with a coagulated substance occurs in a pump that sucks inks and processing liquids. Clogging with a coagulated substance occurs at the inlet or inside of a tube which is a route to a waste ink tank. Coagulation occurs in the upper or other specific part of an absorber provided in a waste ink tank to disturb absorption of inks and processing liquids. In that case, the absorber and the waste ink tank can store less waste liquid than expected. Because of these problem, the respective parts cannot function well and the apparatus becomes faulty.

In order to avoid these problems, when there are two or more combinations of printing liquids (ink-ink, ink-processing liquid) that can coagulate or cause coagulated substance when mixed, it is necessary to provide waste liquid processing parts separately for each combination of the printing liquids in a maintenance part. However, as a result, the number of parts of a waste liquid processing parts increases to elevate the cost and the machine size also increases. There is therefore a need for improved techniques for the treatment and disposal of liquids used in inkjet recording.

SUMMARY OF THE INVENTION

The present invention has been made in view of the above-mentioned circumstances. The invention relates to an inkjet liquid treatment method and, an inkjet recording apparatus, inkjet liquid storing tank, liquid absorber for inkjet liquid storage and inkjet liquid treatment apparatus using this method.

A first aspect of the invention is to provide a method for treating liquids used in inkjet recording comprising:

providing a first printing liquid;

providing a second printing liquid that is capable of causing coagulation if mixed with the first printing liquid; and exposing the first and second printing liquids to each other to form a mixture;

wherein the mixture includes a coagulation-thickening preventing agent which prevents the coagulation.

A second aspect of the invention is to provide a method for treating liquids used in inkjet recording comprising:

providing a first printing liquid including a polyvalent metal ion and a second printing liquid including an anionic compound that is capable of reacting with the metal ion to cause coagulation and thickening if the anionic compound is mixed with the first printing liquid; and exposing the first and second printing liquids to each other to form a mixture, wherein the mixture includes a coagulation-thickening preventing agent which prevents the reaction of the metal ion with the anionic compound.

A third aspect of the invention is to provide a method for treating liquids used in inkjet recording comprising:

using an inkjet recording apparatus, wherein the apparatus uses at least one first printing liquid including a polyvalent metal ion and at least one second printing liquid including an anionic compound which is capable of reacting with the metal ion to cause coagulation and thickening if mixed with the first printing liquid, wherein the apparatus comprises:

a recording head comprising a plurality of nozzles which fire at least one liquid;

and a liquid treatment device having a liquid storage part that recovers the printing liquids fired from the recording head during a non-printing period and stores the printing liquids, wherein a mixture including at least one of the first printing liquid(s) and at least one of the one second printing liquid(s) discharged from the recording head during the non-printing period is stored in the liquid storage part, wherein the mixture stored in the liquid storage part includes a coagulation-thickening preventing agent which prevents the reaction of the metal ion with the anionic compound.

A fourth aspect of the invention is to provide an inkjet recording apparatus which uses at least one first printing liquid including a polyvalent metal ion and at least one second printing liquid including an anionic compound which is capable of reacting with the metal ion to cause coagulation and thickening if mixed with the first printing liquid, the apparatus comprising:

a recording head comprising a plurality of nozzles which fire at least one liquid;

and a liquid treatment device having a liquid storage part that recovers the printing liquids fired from the recording head during a non-printing period and stores the printing liquids, wherein a mixture including at least one of the first printing liquid(s) and at least one of the second printing liquid(s) fired from the recording head during the non-printing period is stored in the liquid storage part, and wherein the mixture stored in the liquid storage part includes a coagulation-thickening preventing agent which prevents the reaction of the metal ion with the anionic compound.

A fifth aspect of the invention is to provide an inkjet liquid storage tank used in an inkjet recording apparatus, wherein the apparatus uses at least one first printing liquid including a polyvalent metal ion and at least one second printing liquid including an anionic compound which is capable of reacting with the metal ion to cause coagulation and thickening if mixed with the first printing liquid, wherein the apparatus comprises:

a recording head comprising a plurality of nozzles which fire at least one liquid;

and a liquid treatment device comprising at least a liquid storage tank that recovers the printing liquids discharged from the recording head during a non-printing period and stores the printing liquids, wherein a mixture including at least one of the first printing liquid(s) and at least one of the second printing liquid(s) discharged from the recording head during the non-printing period is stored in the liquid storage tank, and wherein the tank contains a coagulation-thickening preventing agent which prevents the reaction of the metal ion with the anionic compound, the agent being contained in a state which allows the agent to mix with the mixture.

A sixth aspect of the invention is to provide a liquid absorber for an inkjet liquid storage used in an inkjet recording apparatus, wherein the apparatus uses at least one first printing liquid including a polyvalent metal ion and at least one second printing liquid including an anionic compound which is capable of reacting with the metal ion to cause coagulation and thickening if mixed with the first printing liquid, wherein the apparatus comprises:

a recording head comprising a plurality of nozzles which fire at least one liquid;

and a liquid treatment device having a liquid storage part that recovers the printing liquids discharged from the recording head during a non-printing period in order to maintain the recording head and stores the printing liquids, wherein the liquid storage part includes at least a liquid absorber for inkjet liquid storage, the absorber being able to store the at least one liquid fired from the nozzles, wherein a mixture including at least one of the first printing liquid(s) and at least one of the second printing liquid(s) fired from the recording head during the non-printing period is stored in the liquid storage part, and wherein the tank contains a coagulation-thickening preventing agent which prevents the reaction of the metal ion with the anionic compound, the agent being contained in a state which allows the agent to mix with the mixture.

A seventh aspect of the invention is to provide an inkjet liquid treatment apparatus used in an inkjet recording apparatus which uses at least one first printing liquid including a polyvalent metal ion and at least one second printing liquid including an anionic compound which is capable of reacting with the metal ion to cause coagulation and thickening if mixed with the first printing liquid, wherein the inkjet recording apparatus comprises:

a recording head comprising a plurality of nozzles which fire at least one liquid;

and a liquid treatment device having a liquid storage part that recovers the printing liquids fired from the recording head during a non-printing period and stores the printing liquids, wherein a mixture including at least one of the first printing liquid(s) and at least one of the second printing liquid(s) fired from the recording head during the non-printing period is stored in the liquid storage part, wherein the mixture stored in the liquid storage part includes a coagulation-thickening preventing agent which prevents the reaction of the metal ion with the anionic compound.

DESCRIPTION OF THE INVENTION

One embodiment of the present invention is a method for treating liquids used in inkjet recording comprising:
providing a first printing liquid;
providing a second printing liquid that is capable of causing coagulation if mixed with the first printing liquid; and
exposing the first and second printing liquids to each other to form a mixture;
wherein the mixture includes a coagulation-thickening preventing agent which prevents the coagulation.

Another embodiment of the present invention is a method for treating liquids used in inkjet recording comprising:
providing a first printing liquid including a polyvalent metal ion and a second printing liquid including an anionic compound that is capable of reacting with the metal ion to cause coagulation and thickening if the anionic compound is mixed with the first printing liquid; and
exposing the first and second printing liquids to each other to form a mixture,
wherein the mixture includes a coagulation-thickening preventing agent which prevents the reaction of the metal ion with the anionic compound.

In this embodiment, the coagulation-thickening preventing agent may be a chelating agent that chelates the metal ion or a masking agent that masks the metal ion and protects it from the anionic compound.

When the coagulation-thickening preventing agent is a chelating agent that chelates the metal ion or a masking agent that masks the metal ion and protects it from the anionic compound, the coagulation-thickening preventing agent may be used in a form of a solution in a liquid containing a non-volatile organic solvent and water.

When the coagulation-thickening preventing agent is a chelating agent that chelates the metal ion or a masking agent that masks the metal ion and protects it from the anionic compound and the coagulation-thickening preventing agent is used in a form of a solution in a liquid containing a non-volatile organic solvent and water, the coagulation-thickening preventing agent may contain a surfactant.

When the coagulation-thickening preventing agent is a chelating agent that chelates the metal ion or a masking agent that masks the metal ion and protects it from the anionic compound and the coagulation-thickening preventing agent is used in a form of a solution in a liquid containing a non-volatile organic solvent and water and the coagulation-thickening preventing agent contains a surfactant, the non-volatile organic solvent may be at least one selected from poly-hydric alcohols and glycol ethers.

The coagulation-thickening preventing agent may be at least one selected from the group consisting of nitrilotriacetic acid, N,N-(2-hydroxyethyl)-glycine, ethylenediamine-N,N,N',N'-tetraacetic acid, dicarboxylic acid, tricarboxylic acid, phosphoric acid and salts thereof.

When the coagulation-thickening preventing agent is at least one selected from the group consisting of nitrilotriacetic acid, N,N-(2-hydroxyethyl)-glycine, ethylenediamine-N,N,N',N'-tetraacetic acid, dicarboxylic acid, tricarboxylic acid, phosphoric acid and salts thereof, the dicarboxylic acid and salts thereof may be at least one selected from tartaric acids consisting of tartaric acid, potassium tartrate and sodium potassium tartrate, and the tricarboxylic acid and salts thereof may be at least one selected from citric acids consisting of citric acid, lithium citrate, potassium citrate, potassium dihydrogen citrate, sodium citrate, disodium hydrogencitrate and triammonium citrate.

The content of the polyvalent metal ion contained in the first printing liquid may be 100 ppm or higher.

The content of the polyvalent metal ion contained in the first printing liquid may be 500 ppm or higher.

The polyvalent metal ion may be at least one selected from the group consisting of Mg, Ca, Ba, Cu, Co, Ni, Zn, Fe, Al, La, Nd, Y, Pr, Sm, Sb and In ions.

The polyvalent metal ion may be a Mg ion.

The anionic compound may be an anionic colorant.

Two or more inks containing colorants may be used as the printing liquid.

At least one ink containing a colorant and at least one processing liquid may be used as the printing liquids.

Another embodiment of the invention is a method for treating liquids used in inkjet recording comprising:
using an inkjet recording apparatus, wherein the apparatus uses at least one first printing liquid including a polyvalent metal ion and at least one second printing liquid including an anionic compound which is capable of reacting with the metal ion to cause coagulation and thickening if mixed with the first printing liquid,
wherein the apparatus comprises:
a recording head comprising a plurality of nozzles which fire at least one liquid;
and a liquid treatment device having a liquid storage part that recovers the printing liquids fired from the recording head during a non-printing period and stores the printing liquids,
wherein a mixture including at least one of the first printing liquid(s) and at least one of the one second printing liquid(s) fired from the recording head during the non-printing period is stored in the liquid storage part,
wherein the mixture stored in the liquid storage part includes a coagulation-thickening preventing agent which prevents the reaction of the metal ion with the anionic compound.

Another embodiment of the invention is an inkjet recording apparatus which uses at least one first printing liquid including a polyvalent metal ion and at least one second printing liquid including an anionic compound which is capable of reacting with the metal ion to cause coagulation and thickening if mixed with the first printing liquid, the apparatus comprising:
a recording head comprising a plurality of nozzles which fire at least one liquid;
and a liquid treatment device having a liquid storage part that recovers the printing liquids fired from the recording head during a non-printing period and stores the printing liquids,
wherein a mixture including at least one of the first printing liquid(s) and at least one of the second printing liquid(s) fired from the recording head during the non-printing period is stored in the liquid storage part, and
wherein the mixture stored in the liquid storage part includes a coagulation-thickening preventing agent which prevents the reaction of the metal ion with the anionic compound.

In this embodiment, the liquid storage part may contain a liquid absorber.

The liquid storage part may contain a liquid storage tank.

The liquid treatment device may have only one one-chamber type liquid storage part that stores all kinds of printing liquids fired from the recording head in a mixed state.

When the liquid treatment device has only one one-chamber type liquid storage part that stores all kinds of printing liquids fired from the recording head in a mixed state, the liquid treatment device may have only one liquid recovering pipe that recovers all kinds of printing liquids fired from the recording head in a mixed and transfers the mixture into the one-chamber type liquid storage part.

The coagulation-thickening preventing agent may be included in the liquid storage part in a state that enables the agent to mix with the mixture including both the first and second printing liquids. The agent may exist in the liquid storage part before the mixture enters the part.

The inkjet recording apparatus may include a device that adds a coagulation-thickening preventing agent to at least one liquid selected from the mixture including both the first and second printing liquids, the first printing liquid before mixed with the second printing liquid, and the second printing liquid before mixed with the first printing liquid, at any time after firing of at least one of the first printing liquid and the second printing liquid from the recording head.

The inkjet recording apparatus may include a device that adds a coagulation-thickening preventing agent to the first printing liquid before mixed with the second printing liquid at any time after discharge of the first printing liquid from the recording head.

When the inkjet recording apparatus comprises a device that adds a coagulation-thickening preventing agent to at least one liquid selected from the mixture including both the first and second printing liquids, the first printing liquid before mixed with the second printing liquid, and the second printing liquid before mixed with the first printing liquid at any time after firing of at least one of the first printing liquid and the second printing liquid from the recording head, the device may be a liquid firing device having a nozzle that fires a liquid including the coagulation-thickening preventing agent dissolved therein.

The following constitution is possible: the recording head is provided with a plurality of nozzles that fires at least two liquids separately, at least one of the liquids is the printing liquid, and at least one of the other liquids includes the coagulation-thickening preventing agent dissolved therein.

Another embodiment of the invention is an inkjet liquid storage tank used in an inkjet recording apparatus, wherein the apparatus uses at least one first printing liquid including a polyvalent metal ion and at least one second printing liquid including an anionic compound which is capable of reacting with the metal ion to cause coagulation and thickening if mixed with the first printing liquid, wherein the apparatus comprises:

a recording head comprising a plurality of nozzles which fire at least one liquid;

and a liquid treatment device comprising a liquid storage tank that recovers the printing liquids fired from the recording head during a non-printing period and stores the printing liquids, wherein a mixture including at least one of the first printing liquid(s) and at least one of the second printing liquid(s) fired from the recording head during the non-printing period is stored in the liquid storage tank, and wherein the tank contains a coagulation-thickening preventing agent which prevents the reaction of the metal ion with the anionic compound, the agent being contained in a state which allows the agent to mix with the mixture.

Another embodiment of the invention is a liquid absorber for an inkjet liquid storage used in an inkjet recording apparatus, wherein the apparatus uses at least one first printing liquid including a polyvalent metal ion and at least one second printing liquid including an anionic compound which is capable of reacting with the metal ion to cause coagulation and thickening if mixed with the first printing liquid, wherein the apparatus comprises:

a recording head comprising a plurality of nozzles which fire at least one liquid;

and a liquid treatment device having a liquid storage part that recovers the printing liquids fired from the recording head during a non-printing period in order to maintain the recording head and stores the printing liquids, wherein the liquid storage part includes a liquid absorber for inkjet liquid storage, the absorber being able to store the at least one liquid fired from the nozzles, wherein a mixture including at least one of the first printing liquid(s) and at least one of the second printing liquid(s) fired from the recording head during the non-printing period is stored in the liquid storage part, and wherein the tank contains a coagulation-thickening preventing agent which prevents the reaction of the metal ion with the anionic compound, the agent being contained in a state which allows the agent to mix with the mixture.

Another embodiment of the invention is an inkjet liquid treatment apparatus used in an inkjet recording apparatus which uses at least one first printing liquid including a polyvalent metal ion and at least one second printing liquid including an anionic compound which is capable of reacting with the metal ion to cause coagulation and thickening if mixed with the first printing liquid, wherein the inkjet recording apparatus comprises:

a recording head comprising a plurality of nozzles which fire at least one liquid;

and a liquid treatment device having a liquid storage part that recovers the printing liquids fired from the recording head during a non-printing period and stores the printing liquids, wherein a mixture including at least one of the first printing liquid(s) and at least one of the second printing liquid(s) fired from the recording head during the non-printing period is stored in the liquid storage part, wherein the mixture stored in the liquid storage part includes a coagulation-thickening preventing agent which prevents the reaction of the metal ion with the anionic compound.

The liquid storage tank, the liquid absorber, or the liquid storage part may include the coagulation-thickening preventing agent even before the mixture including both the first and second printing liquids enter the tank or the storage part or contact the absorber, or even before the maintenance is conducted.

According to the invention, an inkjet liquid treatment method capable of suppressing coagulation and thickening even when two or more printing liquids which can coagulate and thicken when mixed are exposed to each other and, an inkjet recording apparatus, an inkjet liquid storing tank, a liquid absorber for inkjet liquid storage, and an inkjet liquid treatment apparatus using this method, can be provided. In the following, the invention is described with reference to a specific combination of compounds in the printing liquids which can cause coagulation or thickening when mixed. However, the invention is not limited to the specific combination and other combinations can also be applied.

(Inkjet Liquid Treatment Method)

The inkjet liquid treatment method of the invention is a method comprising providing a first printing liquid including a polyvalent metal ion and a second printing liquid including an anionic compound that is capable of reacting with the metal ion to cause coagulation and thickening when mixed with the first printing liquid, exposing the first and second printing liquids to each other to form a mixture, wherein the mixture includes a coagulation-thickening preventing agent which prevents the reaction of the metal ion with the anionic compound.

Therefore, according to the inkjet liquid treatment method of the invention, coagulation and thickening of the mixture can be suppressed even when two or more printing liquids that can coagulate and thicken when mixed are treated in a mixed state.

Such an inkjet liquid treatment method of the invention may be used particularly preferably in an inkjet recording apparatus using the first printing liquid and the second printing liquid in combination as a printing liquid.

When the inkjet liquid treatment method of the invention is used in an inkjet recording apparatus, it is preferable to utilize an inkjet apparatus having a constitution described below.

The inkjet recording apparatus may be preferably an inkjet recording apparatus using at least one first printing liquid and at least one second printing liquid and comprising a recording head that comprises a plurality of nozzles firing at least one liquid and a liquid treatment device that comprises a liquid storage part recovering the printing liquids fired from the recording head during a non-printing period and storing the printing liquids, wherein the liquid storage part can store a mixture which includes at least one of the first printing liquid(s) and at least one of the second printing liquid(s) fired from the recording head during the non-printing period.

In this inkjet recording apparatus, the mixture stored in the liquid storage part includes a coagulation-thickening preventing agent. The coagulation-thickening preventing agent included in the mixture stored in the liquid storage part can be added at any time after the first printing liquid and second printing liquid are fired from a recording head in a non-printing period such as maintenance but before both liquids are mixed and finally stored in the liquid storage part. However, the agent may be added in periods other than the period described above.

Details of the method of adding a coagulation-thickening preventing agent are described below including also a specific constitution of an inkjet recording apparatus to which an inkjet liquid treatment method of the invention is applied.

In the inkjet recording apparatus, clogging in parts of the apparatus that collects disposes of printing liquids can be prevented even when a first printing liquid and second printing liquid fired from a recording head in a non-printing period are mixed. Further, it is not necessary to provide separate members and apparatuses relating to treatment of printing liquids for every combination of printing liquids even if each combination can coagulate and thicken when mixed with any of the other combinations. Therefore, the constitution of these members and apparatuses can be simplified and its size can be reduced. The cost can also be reduced.

Although the inkjet liquid treatment method of the invention may be used particularly preferably in the inkjet recording apparatus as described above, the application of the invention is not limited to the apparatus. Of course, the method can be applied, if necessary, also when a printing liquid is treated outside the inkjet apparatus. The method can be used, for example when the following printing liquids are treated together: printing liquids in ink cartridges recovered from retail stores after the expiration of usable period; printing liquids in ink cartridges disposed of unused; printing liquids in ink cartridges which have been left in bad environments and has become unusable; printing liquids in a replenishing ink bottle; and the like. The method may be used for disposal of waste liquids used in inkjet recording. Therefore, the coagulation-thickening preventing agent may be included in the mixture when printing liquids are recovered and disposed of.

Next, the printing liquid and coagulation-thickening preventing agent used in the inkjet liquid treatment method of the invention are described in more detail.

Printing Liquid

Regarding the printing liquid used in the inkjet liquid treatment method of the invention, the two kinds of printing liquids (first printing liquid and second printing liquid) must be used in combination, which will be mixed, for example at the time of their disposal.

The first printing liquid includes a polyvalent metal ion and the second printing liquid includes an anionic compound that is capable of reacting with the metal ion contained in the first printing liquid to cause coagulation or thickening or both when mixed with the first printing liquid.

These first and second printing liquids each are used as an ink including a colorant or a processing liquid which includes no colorant and which prevents inter-color bleed when the ink is provided onto the surface of a recording medium. In this case, the first printing liquid may be used as the ink or the processing liquid and the second printing liquid may be used as the ink or the processing liquid.

In the case of an inkjet recording apparatus, preferably, at least two of the printing liquids used is used as inks, or at least one of them (but not all of them) is used as an ink and the other of them is used as a processing liquid.

Various components contained in a printing liquid, namely, the polyvalent metal ion, the anionic compound, colorants, and other components are described below.

Polyvalent Metal Ion

The polyvalent metal ion contained in a first printing liquid is not particularly restricted providing it is a known polyvalent metal ion, and examples thereof include Mg, Ca, Ba, Cu, Co, Ni, Zn, Fe, Al, La, Nd, Y, Pr, Sm, Sb and In. These metal ions can be added to a first printing liquid in a form of a salt. Examples of the salt include phosphates, sulfates, nitrates, and acetates. The salt may have a solubility of preferably more than 10 in order to suppress deposition thereof in a first printing liquid. When the solubility is 10 or less, clogging at a nozzle part in a recording head occurs and the long-term stability of the ink deteriorates in some cases.

As the polyvalent metal ion, Mg is particularly preferable among the above-mentioned metal ions. When Mg is used, secondary problems such as generation of clogging at a nozzle part of a recording head do not occur easily as compared with the other metal ions. Therefore, printing stability is improved.

The concentration of the polyvalent metal ion contained in a first printing liquid may be preferably 100 ppm or higher, more preferably 500 ppm or higher. When the concentration of the polyvalent metal ion contained in a first printing liquid is lower than 100 ppm, the effects owing to metal ions described above such as improvement in water resistance and suppression of inter-color bleed cannot be obtained sufficiently and an image density lowers in some cases.

Anionic Compound

The anionic compound contained in a second printing liquid is not particularly restricted providing it is capable of reacting with a polyvalent metal ion contained in the first printing liquid to cause coagulation or thickening or both.

Specifically, anionic colorants and anionic polymer additives can be cited as examples. These specific examples will be described below.

Colorant

When the printing liquid is used as an ink, known colorants (pigments, dyes) are added. As the colorant added to a first printing liquid, cationic colorants are used, and as the colorant added to a second printing liquid, anionic colorants are used.

The dyes may be water-soluble dyes or disperse dyes. Specific examples of the water-soluble dyes include C. I. Direct Black-2, -4, -9, -11, -17, -19, -22, -32, -80, -151, -154, -168, -171, -194, -195, C. I. Direct Blue-1, -2, -6, -8, -22, -34, -70, -71, -76, -78, -86, -112, -142, -165, -199, -200, -201, -202, -203, -207, -218, -236, -287, -307-, C. I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, -227, C. I. Direct Yellow-1, -2, -4, -8, -11, -12, -26, -27, -28, -33, -34, -41, -44, -48, -58, -86, -87, -88, -132, -135, -142, -144, -173, C. I. Food Black-1, -2, C. I. Acid Black-1, -2, -7, -16, -24, -26, -28, -31, -48, -52, -63, -107, -112, -118, -119, -121, -156, -172, -194, -208, C. I. Acid Blue-1, -7, -9, -15, -22, -23, -27, -29, -40, -43, -55-, -59, -62, -78, -80, -81, -83, -90, -102, -104, -111, -185, -249, -254, C. I. Acid Red-1, -4, -8, -13, -14, -15, -18-, -21, -26, -35, -37, -52, -110, -144, -180, -249, -257, -289, C. I. Acid Yellow-1, -3, -4, -7, -11, -12, -13, -14, -18, -19, -23, -25, -34, -38, -41, -42, -44, -53, -55, -61, -71, -76, -78, -79, and C. I. Acid Yellow-122.

Specific examples of the disperse dyes include C. I. Disperse Yellow-3, -5, -7, -8, -42, -54, -64, -79, -82, -83, -93, -100, -119, -122, -126, -160, -184:1, -186, -198, -204, -224, C. I. Disperse Orange-13, -29, -31:1, -33, -49, -54, -66, -73, -119, -163, C. I. Disperse Red-1, -4, -11, -17, -19, -54, -60, -72, -73, -86, -92, -93, -126, -127, -135, -145, -154, -164, -167:1, -177, -181, -207, -239, -240, -258, -278, -283, -311, -343, -348, -356, -362, C. I. Disperse Violet-33, C. I. Disperse Blue-14, -26, -56, -60, -73, -87, -128, -143, -154, -165, -165:1, -176, -183, -185, -201, -214, -224, -257, -287, -354, -365, -368, C. I. Disperse Green-6:1 and -9.

Pigments can also be used. Specific examples of the black pigment include, however not limited to, RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080, RAVEN 1060 (these are manufactured by Columbian Carbon), REGAL 1400R, REGAL 1330R, REGAL 1660R, MOGUL L, BLACK PEARLS L, MONARCH 700, MONARCH 800, MONARCH 880, MONARCH 900, MONARCH 1000, MONARCH 1100, MONARCH 1300, MONARCH 1400 (these are manufactured by Cabot Corporation), Color Black FW1, Color Black FW2, Color Black FW2V, Color Black 18, Color Black FW200, Color Black S150, Color Black S160, Color Black S170, PRINTEX 35, PRINTEX U, PRINTEX V, PRINTEX 140U, PRINTEX 140V, Special Black 6, Special Black 5, Special Black 4A, Special Black 4 (these are manufactured by Degussa), No. 25, No. 33, No. 40, No. 47, No. 52, No. 900, No. 2300, MCF-88, MA600, MA7, MA8, and MA100 (these are manufactured by Mitsubishi Chemical Co., Ltd.).

Pigments obtained by conducting surface modification treatment on the pigments can be used as examples of the pigments which are self-dispersible in water. Other examples of usable pigment which is self-dispersible in water include CAB-O-JET-200, CAB-O-JET-300, IJX-253, IJX-266, IJX-444, IJX-273 and IJX-55 manufactured by Cabot Corporation, Microjet Black CW-1 and CW-2 manufactured by Orient Chemical Industries, Ltd., and commercially available self-disperse pigments such as self-disperse pigments marketed from Nippon Shokubai Co., Ltd.

Examples of the cyan ink pigment include, however not limited to, C. I. Pigment Blue-1, -2, -3, -15, -15:1, -15:2, -15:3, -15:4, -16, -22 and -60.

Examples of the magenta ink pigment include, however not limited to, C. I. Pigment Red-5, -7, -12, -48, -48:1, -57, -112, -122, -123, -146, -168, -184 and -202.

Examples of the yellow ink pigment include, however not limited to, C. I. Pigment Yellow-1, -2, -3, -12, -13, -14, -16, -17, -73, -74, -75, -83, -93, -95, -97, -98, -114, -128, -129, -138, -151- and -154.

As the colorants of respective colors, so-called capsule dyes and pigments obtained by capsulation of colorants with various resins may be used.

Particularly, from the viewpoint of obtaining an excellent image, it is preferable to use, in combination, a black ink (second printing liquid) including as a colorant an anionic dye or carbon black having an anionic surface group, and a color ink (first printing liquid) including the polyvalent metal ion in a total amount of 500 ppm or more. In this combination, owing to the use of a black ink and a color ink together in a black ink image part, the image density increases, the inter-color bleed at a part where a black image and a color image are adjacent is suppressed, and the image quality is improved.

Other Additives

The printing liquid contains water as a solvent in addition to the above-mentioned components, and further, a water-soluble organic solvent can be added. When a water-soluble organic solvent is added to a printing liquid, the moisture retaining property of an ink and processing liquid and the solubility of a colorant are further improved. As a result, clogging can be prevented, discharge stability at the time of firing of a printing liquid from a recording head can be maintained. Further, coagulation and deposition of a processing agent contained in a processing liquid, and a colorant can be prevented during a long-term storage of the printing liquid.

Specific examples of the water-soluble organic solvent include, in the case of poly-hydric alcohols, ethylene glycol, diethylene glycol, propylene glycol, butylene glycol, triethylene glycol, 1,5-pentanediol, 1,2,6-hexanetriol and glycerine.

The water-soluble organic solvent may be a glycol ether. Examples thereof include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and poly-hydric alcohol derivatives such as an ethylene oxide adducts of diglycerine.

The water-soluble organic solvent may be a nitrogen-containing solvent. Examples thereof include pyrrolidone, N-methy-2-pyrrolidone, cyclohexylpyrrolidone and triethanolamine.

The water-soluble organic solvent may be a sulfur-containing solvent. Examples thereof include thiodiethanol, thiodiglycerol, sulfolane and dimethyl sulfoxide. Additionally, propylene carbonate, ethylene carbonate can also be used together. Alcohols such as ethanol, isopropyl alcohol, butyl alcohol, and benzyl alcohol can also be used. The content of the water-soluble organic solvent is from 1 to 60 parts by mass, preferably from 5 to 40 parts by mass.

Further, a surfactant may be added to a printing liquid. As the surfactant, a compound having a structure which includes a hydrophilic part and a hydrophobic part together in the molecule can be used. The surfactant may be anionic, cationic, amphoteric or nonionic.

Examples of the anionic surfactant include alkylbenzenesulfonates, alkyphenylsulfonates, alkylnaphthalenesulfonates, salts of higher fatty acids, sulfate ester salts of higher fatty acid esters, sulfonate salts of higher fatty acid esters, sulfate ester salts of higher alcohol ethers, sulfonate salts of higher alcohol ethers, higher alkylsulfosuccinate salts, higher alkylphosphate ester salts, and phosphate ester salts of higher alcohol ethylene oxide adducts. For example, dodecylbenzenesulfonate salts, tetradecylbenzenesulfonate salts, isopropylnaphthalenesulfonate salts, monobutylphenylphenolmonosulfonate salts, monobutylbiphenylsulfonate salts, monobutylbiphenylsulfonate salts, dibutylphenylphenoldisulfonate salts can also be effectively used.

Examples of the nonionic surfactant include polypropylene glycol ethylene oxide adducts, polyoxyethylene nonylphenyl ethers, polyoxyethylene octylphenyl ethers, polyoxyethylene dodecylphenyl ethers, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, aliphatic alkanolamides, glycerin esters and sorbitan esters.

The cationic surfactant may be a tetraalkyl ammonium salt, an alkylamine salt, a benzalkonium salt, an alkylpyridium salt or an imidazolium salt, and examples thereof include dihydroxyethylstearylamine, 2-heptadecenyl-hydroxyethylimidazoline, lauryldimethylbenzylammonium chloride, cetylpyridinium chloride and stearamidemethylpyridium chloride.

Silicone-based surfactants such as polysiloxane oxyethylene adducts, and fluorine-based surfactants such as salts of perfluoroalkylcarboxylic acids, perfluoroalkylsulfonate salts and oxyethylene perfluoroalkyl ethers, and bio-surfactants such as spiculisporic acid, rhamnolipid and lysolecithin, can also be used.

The amount of the surfactant added in a printing liquid is preferably less than 10 parts by mass. When the amount is 10 parts by mass or larger, optical density deteriorates and the storage stability of a printing liquid deteriorates in some cases.

In addition, for the purpose of controlling the properties of a printing liquid such as improvement in dischargeability, the following compounds can be added: polyethyleneimine, polyamines, polyvinylpyrrolidone, polyethylene glycol, cellulose derivatives such as ethylcellulose and carboxylmethylcellulose, polysaccharides and derivatives thereof, other water-soluble polymers, polymer emulsions such as acrylic polymer emulsion and polyurethane-based emulsion, cyclodextrin, large ring amines, dendrimer, crown ethers, urea, derivatives of urea, acetamide and the like.

In order to regulate electric conductivity and pH, compounds of alkali metals such as potassium hydroxide, sodium hydroxide and lithium hydroxide, and nitrogen-containing compounds such as ammonium hydroxide, triethanolamine, diethanolamine, ethanolamine and 2-amino-2-methyl-1-propanol can be used.

Antioxidants, fungicides, viscosity regulating agents, conductive agents, ultraviolet absorbers can also be used, if necessary.

Coagulation-Thickening Preventing Agent

The coagulation-thickening preventing agent used in the inkjet liquid treatment method of the invention has a function of preventing the reaction of a metal ion contained in the first printing liquid with an anionic compound contained in the second printing liquid, and preventing coagulation and thickening of the mixture which includes these two printing liquids. The coagulation-thickening preventing agent reacts with the metal ion by chelating as described later, to form a reaction product with excellent solubility in the mixture, which is an aqueous liquid.

The coagulation-thickening preventing agent is not limited to particular compounds and may be any compound that has the function. Specifically, the agent may be a chelating agent which chelates the polyvalent metal ion or a masking agent which masks the polyvalent metal ion and protects it from the anionic compound.

The coagulation-thickening preventing agent may be acetylacetone, adenine, 5'-adenosine triphosphate, 2-aminoethanol, 2-aminoethanethiol, imidazole, ethylamine, ethylenediamine, catechol, citric acid, glycylglycine, glycine, glutamic acid, acetic acid, L-2,4-diaminobutyric acid, diethylenetriamine, L-cysteine, dibenzo-18-crown-6, oxalic acid, triethylenetetramine, picolic acid, histidine, 2,2'-bipyridyl, pyridine, 1,10-phenanthroline, L-phenylalanine, phenol, phthalic acid, malonic acid, or a salt thereof.

Among these coagulation-thickening preventing agents, particularly, nitrilotriacetic acid, N,N-(2-hydroxyethyl)-glycine, ethylenediamine-N,N,N',N'-tetraacetic acid, dicarboxylic acid, tricarboxylic acid, phosphoric acid and salts thereof are preferable. The dicarboxylic acids (including salts thereof) may be preferably tartaric acids, and the tricarboxylic acids (including salts thereof) may be preferably citric acids. These coagulation-thickening preventing agents effectively chelate or mask particularly a magnesium ion.

Examples of the citric acids include citric acid, lithium citrate, potassium citrate, potassium dihydrogen citrate, sodium citrate, sodium dihydrogen citrate and ammonium citrate, and examples of the tartaric acids include tartaric acid, potassium tartrate and sodium potassium tartrate.

The coagulation-thickening preventing agent may be selected depending on the composition of the printing liquid which is to be treated, particularly depending on the combination of the polyvalent metal ion and the anionic compound so that the function of the agent is optimized. When replenishing of the coagulation-thickening preventing agent cannot be conducted at arbitrary timing, which is the case in an inkjet recording apparatus, the amount of the coagulation-thickening preventing agent stored beforehand in the inkjet recording apparatus can be selected depending on the amount of the printing liquid used in the inkjet recording apparatus.

The coagulation-thickening preventing agent can be used in a form of a solution in a solvent (hereinafter, abbreviated as "coagulation-thickening preventing agent solution" in some cases), whilst it can also be used in a form of raw liquid or solid. Particularly when the coagulation-thickening preventing agent should be used as an aqueous solution, evaporation of moisture, change in concentration, and deposition of the coagulation-thickening preventing agent can be suppressed by using the agent in a form of a solution whose solvent is water or a non-volatile organic solvent.

The non-volatile organic solvent used in the coagulation-thickening preventing agent solution may be a known compound, and typical examples thereof include poly-hydric alcohols and glycol ethers. Specific examples thereof include, in the case of the poly-hydric alcohols, ethylene glycol, diethylene glycol, propylene glycol, butylene glycol, triethylene glycol, 1,5-pentanediol, 1,2,6-hexanetriol and glycerine.

The non-volatile organic solvent may be a glycol ether. Examples thereof include ethylene glycol monomethyl ether, ethylene glycol monoethyl ether, ethylene glycol monobutyl ether, diethylene glycol monomethyl ether, diethylene glycol monoethyl ether, dieithylene glycol monobutyl ether, propylene glycol monobutyl ether, dipropylene glycol monobutyl ether, and polyhydric alcohol derivatives such as an ethylene oxide adducts of diglycerine.

The non-volatile organic solvent may be a nitrogen-containing solvent such as pyrrolidone, N-methy-2-pyrrolidone, cyclohexylpyrrolidone or triethanolamine, or a sulfur-containing solvent such as thiodiethanol, thiodiglycerol, sulfolane or dimethyl sulfoxide. To a coagulation-thickening preventing agent solution, preservatives, fungicides and germicides can be further added, if necessary.

Further, a surfactant can also be added to a coagulation-thickening preventing agent solution. Examples of the surfactant are the same as the examples of the surfactant that is used in a printing liquid.

(Inkjet Recording Apparatus, Inkjet Liquid Storing Tank, Inkjet Liquid Storing Liquid Absorber, Inkjet Liquid Treatment Apparatus)

Next, an inkjet recording apparatus, inkjet liquid storage tank (liquid storage tank), liquid absorber for inkjet liquid storage (liquid absorber) and inkjet liquid treatment apparatus (liquid treatment device) of the invention utilizing the inkjet liquid treatment method of the invention as described above will be described below.

The inkjet recording apparatus of the invention utilizes the inkjet liquid treatment method of the invention described above, and specifically, the apparatus may preferably have a constitution as described below:

The inkjet recording apparatus has a constitution using at least one first printing liquid and at least one second printing liquid, as printing liquids, wherein the apparatus at least has a recording head comprising a plurality of nozzles that fires at least one liquid and a liquid treatment device comprising a liquid storage part that recovers the printing liquids fired from the recording head in a non-printing period and stores the liquids wherein the liquid storage part stores a mixture comprising at least one of the first printing liquid(s) and at least one of the second printing liquid(s) fired from the recording head in a non-printing period, wherein the mixture stored in the liquid storage part includes a coagulation-thickening preventing agent which prevents the reaction of the metal ion with the anionic compound.

Since the inkjet recording apparatus of the invention utilizes the inkjet liquid treatment method of the invention, coagulation and thickening of the mixture can be suppressed when a first printing liquid and a second printing liquid are treated in a mixed state in the apparatus. The treatment may be disposal of the printing liquids.

In the inkjet recording apparatus of the invention, the mixture stored in a liquid storage part includes a coagulation-thickening preventing agent. However, timing of addition of the coagulation-thickening preventing agent to a mixture is not particularly restricted.

The coagulation-thickening preventing agent can be added to at least one liquid selected from the first printing liquid, the second printing liquid and the mixture including both liquids. The timing of addition is at any time during the period after the first printing liquid and the second printing liquid are fired from the recording head in a non-printing time but before both liquids are mixed and finally stored in the liquid storage part.

Specifically, the coagulation-thickening preventing agent (or coagulation-thickening preventing agent solution) may be previously stored in the liquid storage part so that it will be able to be mixed with a mixture including both the first and second printing liquids. In this case, when the mixture (or the first printing liquid and the second printing liquid before mixing) is recovered into the liquid storage part through a tube and stored in the liquid storage part, the mixture is mixed with the coagulation-thickening preventing agent (or coagulation-thickening preventing agent solution). Therefore, coagulation and thickening of the mixture can be prevented.

When the mixture is recovered through a tube or the like but a coagulation-thickening preventing agent (or a coagulation-thickening preventing agent solution) is not added until a mixture reaches the liquid storage part, it is preferable to store a coagulation-thickening preventing agent (or a coagulation-thickening preventing agent solution) near a liquid inlet of a liquid storage part so that the agent can be mixed with the mixture. The term "liquid inlet" used herein refers to the part where the tube or pipe through which the mixture is transferred to the liquid storage part is connected the liquid storage part). If a coagulation-thickening preventing agent (or a coagulation-thickening preventing agent solution) is not stored near a liquid inlet, coagulation and thickening may occur near the liquid inlet to disturb flowing of the mixture into the liquid storage part.

The form of the liquid storage part used in the inkjet recording apparatus of the invention is not particularly restricted providing it can store the printing liquids fired from a recording head in non-printing periods without scattering of the liquids into an inkjet recording apparatus. The form may be, for example, a form of sealed vessel, or a liquid absorber including a water-absorbing substance capable of absorbing and retaining liquid with a weight which is several to dozens-fold or more of self weight such as a known polymer gel or a fiber. When a liquid absorber is used, the liquid absorber may be placed preferably in a liquid storing tank.

Two or more liquid storage parts may be provided in an inkjet apparatus. However, preferably, only one liquid storage part may be provided in the inkjet recording apparatus of the invention. More preferably, the liquid storage part may be a one-chamber type liquid storage part having, in a liquid storage part, no partition or the like for separately storing every printing liquid fired from a recording head in non-printing periods. In other words, the liquid storage part stores all kinds of printing liquids in a mixed state.

In the inkjet recording apparatus of the invention, coagulation and thickening in the liquid storage part can be suppressed even when all kinds of printing liquids used for printing are stored in a mixed state. Therefore, even if only one one-chamber type liquid storage part is provided, the amount of the liquid actually storable is not smaller than the designed storage volume of a liquid storage part. This contrasts with conventional inkjet printers in which the amount of the liquid storable decreases owing to clogging and the like caused by coagulation and thickening. Because of this fact, according to the invention, the size of the liquid storage part can be made smaller than conventional size.

When only one one-chamber type liquid storage part is used as a liquid treatment device, it is also possible to use only one recovering pipe such as a tube to recover the printing liquids fired from the recording head and to introduce the liquids to the liquid storage part. In particular, when a coagulation-thickening preventing agent (or a coagulation-thickening preventing agent solution) is added almost simultaneously with the firing of a printing liquid from a recording head in non-printing periods, clogging owing to coagulation and thickening of the mixture including both the first and second printing liquids in the recovering pipe can be certainly prevented. Therefore, only one recovering pipe connected to the liquid storage part can be used in the constitution.

On the other hand, if printing liquids that can coagulate and thicken when mixed with each other are used, a liquid treatment device provided in a conventional inkjet recording apparatus has a plurality of liquid storage parts in order to prevent clogging in the liquid storage part and the covering pipe, or uses a liquid storage part whose interior portion is partitioned into two or more chambers. Further, in a conventional inkjet recording apparatus, a plurality of recovering pipes connected to a liquid storage part are provided. Therefore, the liquid treatment device is likely to be complicated and large, and the number of the parts constituting the liquid treatment device increases to elevate the production cost.

However, the inkjet recording apparatus of the invention utilizes the inkjet liquid treatment method of the invention. Accordingly, the liquid treatment device in the inkjet recording apparatus can be simplified and small and can be produced at low cost, as described above.

As described above, a coagulation-thickening preventing agent (or a coagulation-thickening preventing agent solution) can be added to at least one liquid selected from the first printing liquid, the second printing liquid and the mixture including both liquids, at any time during the period after the first printing liquid and the second printing liquid are fired from the recording head in a maintenance period but before both liquids are mixed and finally stored in the liquid storage part.

However, in order to more efficient suppress and prevent coagulation and thickening of the mixture caused by the reaction of the polyvalent metal ion with the anionic compound, it is preferable to add a coagulation-thickening preventing agent (or coagulation-thickening preventing agent solution) at the time when the first printing liquid and the second printing liquid are mixed or immediately after the mixing. It is particularly preferable to add a coagulation-thickening preventing agent (or a coagulation-thickening preventing agent solution) to the first printing liquid at any time during the period from just after the firing of the first printing liquid from the recording head to just before the mixing of the first printing liquid with a second printing liquid.

When a coagulation-thickening preventing agent (or a coagulation-thickening preventing agent solution) is added to the mixture including both the first and second printing liquids at the timing described above or added to the first printing liquid during the period from just after the firing of the first printing liquid from the recording head to just before the formation of the mixture (being mixed with a second printing liquid), the reaction of the polyvalent metal ion with the anionic compound can be prevented more effectively and suppression of the coagulation and thickening of the mixture becomes easier.

The way of adding a coagulation-thickening preventing agent to the first printing liquid, second printing liquid or mixture is not particularly restricted. Known methods can be utilized.

For example, the coagulation-thickening preventing agent may be added by a coagulation-thickening preventing agent solution feeding apparatus connected to the middle of a recovering pipe or connected to the liquid storage part.

However, in the inkjet recording apparatus of the invention, it is preferable to add the coagulation-thickening preventing agent solution by a liquid firing apparatus provided with a nozzle that fires the coagulation-thickening preventing agent solution.

The liquid firing apparatus may be placed so that the apparatus can preferably move along a scanning line that the recording head moves along in printing and maintenance (non-printing). The constitution of the liquid firing apparatus may be similar to that of the recording head used for printing. Hence, the recording head for printing and the coagulation-thickening preventing agent solution imparting head (the liquid discharging apparatus) can be provided on the scanning line.

The generally used recording head has liquid storing cartridges each storing two or more liquids and each liquid can be fired from a separate nozzle. In such a case, the following constitution is possible: at least one printing liquid is contained in a cartridge and one of the other cartridges contains the coagulation-thickening preventing agent solution. Specifically, the following constitution is possible: a recording head comprises a liquid storage cartridge that contains the coagulation-thickening preventing agent solution and liquid storage cartridges containing cyan, magenta, yellow and black inks respectively. In this constitution, the recording head also has a function as a coagulation-thickening preventing agent solution imparting head. Consequently, the structure of the inkjet recording apparatus can be further simplified.

Maintenance of a recording head can be conducted by utilizing a known method in non-printing periods. For example, when a printing liquid in a nozzle of the recording head is fired by dummy jet in non-printing periods, a recording head is moved, before the printing liquid can be fired (dummy jet), to such a position that the printing liquid fired can be recovered to the liquid storage part of the liquid treatment device at the maintenance part.

Alternatively, when a printing liquid in a nozzle of the recording head is fired by suction in non-printing periods, the printing liquid can be sucked via a cap member connected via a suction pump and tube to the liquid storage part of the liquid treatment device. The cap member is placed so that it is closely adhered to the nozzle surface of the recording head which moved to the maintenance part in a maintenance period.

When the recording head and the maintenance head for adding a coagulation-thickening preventing agent solution are used, for example, the recording head is moved to a position in a maintenance part at which a printing liquid can be fired, then a printing liquid is fired by dummy jet or suction, then a coagulation-thickening preventing agent solution imparting head is moved to the same position and a coagulation-thickening preventing agent solution is fired.

In this case, the following sequence is naturally possible: first, the recording head moved to the maintenance part and only the first printing liquid is fired; then a coagulation-thickening preventing agent solution imparting head is moved to the maintenance part and a coagulation-thickening preventing agent solution is fired; then the recording head is again moved to the maintenance part and only the second printing liquid is fired. In this sequence, substantially, only after the addition of the coagulation-thickening preventing agent solution to the first printing liquid, the second printing liquid is further mixed. Therefore, coagulation and thickening of the mixture can be suppressed more efficiently.

When the recording head also has the function of the coagulation-thickening preventing agent solution imparting head, the surfaces of the nozzles for the respective liquids (the first printing liquid, the second printing liquid, and the coagulation-thickening preventing agent solution), which are to be fired from the recording head, are moved to the liquid recovering port that recovers the fired liquids so that the first printing liquid, the coagulation-thickening preventing agent solution and the second printing liquid can be fired in this order as described above.

Other than the firing of a printing liquid in a nozzle by dummy jet-and the suction as described above, a wiper can also be provided to wipe the nozzle surface of the recording head which has been moved to the maintenance part in a maintenance period. Further, it is also possible to perform maintenance that includes a combination of known recording head maintenance methods such as the dummy jet, suction and wiping described above.

In the above, the invention is described mainly using a polyvalent metal ion and an anionic compound as an example of the compounds that react with each other to cause coagulation and thickening. However, the invention can be worked out as long as two liquids that react with each other to cause coagulation and thickening are used, and the coagulation-thickening preventing agent is appropriately selected according to the combination of the liquids.

EXAMPLES

The present invention will be explained in more detail by the examples below, however, the invention is by no means limited to these examples.

I) Preparation of Ink and Coagulation-thickening Preventing Agent Solution

The preparation of an ink include the following: a water-soluble organic solvent, other additives and an ion exchange water are added in appropriate amounts to a colorant solution to prepare a solution including the respective materials in given amounts; then the solution is stirred; then a black ink is filtrated through a filter with a mesh size of 1 μm and a color ink is filtrated through a filter with a mesh size of 0.5 μm to obtain each ink with respective color. A coagulation-thickening preventing agent solution is prepared by adding necessary components in given amounts, mixing and stirring the components, and filtering the solution through a filter with a mesh size of 0.5 μm.

The raw materials used for the preparation of the inks of respective colors of an ink set 1 composed of black, cyan, magenta and yellow and the amounts of the materials to be used are shown below. The raw materials used for the preparation of a coagulation-thickening preventing agent solution land the amounts of the materials to be used are also shown below.

Ink Set 1

| <Black ink> | |
|---|---|
| CABOJET 300 (anionic colorant, manufactured by Cabot Corporation): | 5.0 parts by mass |
| 1,5-pentanediol: | 10 parts by mass |
| thiodiethanol: | 10 parts by mass |
| diethylene glycol monoethyl ether: | 2.0 parts by mass |
| thiourea: | 3.0 parts by mass |
| isopropyl alcohol: | 4.0 parts by mass |
| ion exchange water: | 66 parts by mass |

| <Cyan ink> | |
|---|---|
| C.I. Acid Blue-9: | 3.5 parts by mass |
| 1,5-pentanediol: | 10 parts by mass |
| thiodiethanol: | 10 parts by mass |
| diethylene glycol monoethyl ether: | 2.0 parts by mass |
| thiourea: | 3.0 parts by mass |

| -continued | |
|---|---|
| <Cyan ink> | |
| isopropyl alcohol: | 4.0 parts by mass |
| sodium hydroxide: | 0.03 parts by mass |
| magnesium sulfate: | 1.0 part by mass (corresponding to about 2000 ppm of magnesium) |
| ion exchange water: | 66.47 parts by mass |

This ink includes magnesium ions as the polyvalent metal ion, and the content thereof is about 2000 ppm.

| <Magenta ink> | |
|---|---|
| ILM-377 (manufactured by ILFORD): | 3.0 parts by mass |
| 1,5-pentanediol: | 10 parts by mass |
| thiodiethanol: | 10 parts by mass |
| diethylene glycol monoethyl ether: | 2.0 parts by mass |
| thiourea: | 3.0 parts by mass |
| isopropyl alcohol: | 4.0 parts by mass |
| sodium hydroxide: | 0.03 parts by mass |
| magnesium sulfate: | 1.0 part by mass (corresponding to about 2000 ppm of magnesium) |
| ion exchange water: | 66.97 parts by mass |

This ink includes magnesium ions as the polyvalent metal ion, and the content thereof is about 2000 ppm.

| <Yellow ink> | |
|---|---|
| C.I. Acid Yellow-23: | 3.0 parts by mass |
| 1,5-pentanediol: | 10 parts by mass |
| thiodiethanol: | 10 parts by mass |
| diethylene glycol monoethyl ether: | 2.0 parts by mass |
| thiourea: | 3.0 parts by mass |
| isopropyl alcohol: | 4.0 parts by mass |
| sodium hydroxide: | 0.03 parts by mass |
| magnesium sulfate: | 1.0 part by mass (corresponding to about 2000 ppm of magnesium) |
| ion exchange water: | 66.97 parts by mass |

These inks each include magnesium ions as the polyvalent metal ion, and the content thereof is about 2000 ppm.

| -Coagulation-thickening preventing agent solution 1- | |
|---|---|
| sodium citrate: | 20 parts by mass |
| diethylene glycol: | 20 parts by mass |
| ion exchange water: | 60 parts by mass |

II) Evaluation

II-1) Inkjet Recording Apparatus

Printing and maintenance of a recording head are conducted by the inkjet recording apparatus explained below, using only the ink set or the ink set and the coagulation-thickening preventing agent in combination. Presence or absence of abnormalities of the waste liquid processing system of the maintenance part and the quality of an image printed are evaluated.

The inkjet recording apparatus used utilizes a thermal ink jet mode capable of performing full color printing, and has an experimental model recording head of 400 dpi, 256 nozzles that fire a black ink and a coagulation and thickening-preventing liquid, and an experimental model recording head of 800 dpi, 512 nozzles that fire color inks (cyan, magenta, yellow).

In this inkjet recording apparatus, a maintenance apparatus is provided which comprises a waste liquid processing device comprising a plurality of caps that recover printing liquids and coagulation-thickening preventing agent solutions in nozzles of the recording heads by dummy jet and suction, a waste liquid storage part connected by a tube via a suction pump to the caps, and a wiper that wipes the nozzle surface of the recording head.

Printing liquids and coagulation-thickening preventing agent solutions fired during suction or dummy jet and recovered from the cap part are all recovered through the tube to one waste liquid storing tank containing a liquid absorber made of a polyester film. The liquid absorber has an ability to absorb liquid in an amount of 600 ml at maximum, and set beforehand in the waste liquid storing tank after absorbing 60 ml of the coagulation-thickening preventing agent solution.

Suction of printing liquids and coagulation-thickening preventing agent solutions from the recording head is conducted by driving a suction pump so that a constant amount of liquid is sucked wherein each cap provided corresponding to each nozzle surface that fire each liquid faces the nozzle surface when each recording head is moved to the maintenance part in non-printing periods. On the other hand, dummy jet of a printing liquid or a coagulation-thickening preventing agent solution from a recording head is conducted by firing the printing liquid or a coagulation-thickening preventing agent solution from the nozzle surface into the cap during no-printing periods.

The movement of the dummy jet is so programmed that, in printing an image, a recording head becomes non-printing condition and moves to a maintenance part appropriately. After the movements of the suction or dummy jet, the movements of the recording head and the maintenance part are programmed so that wiping of the nozzle surface is conducted.

For printing of an image, roll paper is used as a recording paper, and printing of an image is conducted in an environment of 23° C. and 55% RH. In this case, the firing of printing liquids and the coagulation-thickening preventing agent from the recording head is performed while a drop of each liquid is formed by applying a plurality of pulses to the liquid. The amount per drop is about 18 pl in the case of a black ink and a coagulation-thickening preventing agent solution and about 6 pl in the case of color inks.

II-2) Presence or Absence of Abnormalities of Waste Liquid Processing System and Quality of Image On a black image part, three colors of cyan, magenta and yellow are continuously primer-printed for carriage 10 reciprocations in lump two way with a coverage of 16.7% for each of cyan, magenta and yellow based on 100% coverage of black, and 100% coverage patch printing is continuously conducted for carriage 10 reciprocations at one-pass bi-directional printing so that black and cyan, black and magenta, and black and yellow are adjacent in this order. FX-P paper is processed in the form of roll and used as the paper for the printing.

Thereafter, a dummy jet operation is conducted in which a black ink and a coagulation-thickening preventing agent solution are fired 1000 times each and color inks are fired 3000 times each from all nozzles into the caps.

When this printing and dummy jets are repeated 1000 times alternately, the system is left for 48 hours while the nozzle surface of the recording head is covered with the caps. Thereafter, the printing liquid and the coagulation-thickening preventing agent are sucked each in an amount of 0.5 ml from the nozzle surface corresponding to each liquid in all heads by a suction pump. Then, the printing-dummy jet-suction operation is again repeated 200 times. In each suction, the presence of clogging in the suction pump or tube and the occurrence counterflow or overflow from the waste liquid storing tank are observed.

If the evaluation is conducted without using a coagulation-thickening preventing agent solution, the dummy jet and suction are performed by discharging only inks from the recording head.

With respect to the resulted printing pattern, the concentration of the black image with primer-printing with color inks is observed. Inter-ColorBleed between black and cyan 100% coverage patch, between black and magenta 100% coverage patch, or between black and yellow 100% coverage patch, are also observed.

III) Evaluation Result

The results regarding the presence or absence of abnormalities of the waste liquid processing system and the quality of an image are shown below. In Example 1 in which a coagulation-thickening preventing agent solution is used together with the ink set 1 composed of a first printing liquid (color ink) and a second printing liquid (black ink), clogging does not occur in the suction pump and tube and the counterflow and overflow from the waste liquid storing tank are not observed.

On the other hand, in Comparative Example 1 using only the ink set 1, the movement was abnormal at 10-th pump suction, and as a result of decomposition, local adhering of a coagulated substance in the tube is observed, and the accumulation of a coagulated substance in the liquid absorber in the waste liquid storing tank is observed around the inlet at which the end of the tube is connected to the waste liquid storing tank.

In both Example 1 and Comparative Example 1, the ink set 1 including the first printing liquids (color inks) and the second printing liquid (black ink) is used. Therefore, the concentration of the black image is high and Inter-color bleed between colors is not observed. Summary of these results are shown in Table 1.

TABLE 1

| | Ink set | Coagulation-thickening preventing agent solution | Presence or absence of abnormalities of waste liquid processing part | Color primer-printing Black image density | Inter-colorBleed between black ink and color inks |
|---|---|---|---|---|---|
| Example 1 | Ink set 1 | Coagulation-thickening preventing agent solution 1 | Absence | 1.55 | None |
| Comparative Example 1 | Ink set 1 | — | Presence (at 10-th suction) | 1.55 | None |

What is claimed is:

1. An inkjet liquid storage tank used in an inkjet recording apparatus,
wherein the apparatus uses at least one first printing liquid including a polyvalent metal ion and at least one second printing liquid including an anionic compound which is capable of reacting with the metal ion to cause coagulation and thickening if mixed with the first printing liquid,
wherein the apparatus comprises:
a recording head comprising a plurality of nozzles which fire at least one liquid;
and a liquid treatment device comprising a liquid storage tank that recovers the printing liquids fired from the recording head during a non-printing period and stores the printing liquids,
wherein a mixture including at least one of the first printing liquid(s) and at least one of the second printing liquid(s) fired from the recording head during the non-printing period is stored in the liquid storage tank, and
wherein the liquid storage tank contains a coagulation-thickening preventing agent which is present in the tank before the mixture enters the tank and which prevents the reaction of the metal ion with the anionic compound, the agent being contained in a state which allows the agent to mix with the mixture.

2. A liquid absorber for an inkjet liquid storage used in an inkjet recording apparatus,
wherein the apparatus uses at least one first printing liquid including a polyvalent metal ion and at least one second printing liquid including an anionic compound which is capable of reacting with the metal ion to cause coagulation and thickening if mixed with the first printing liquid,
wherein the apparatus comprises:
a recording head comprising a plurality of nozzles which fire at least one liquid;
and a liquid treatment device having a liquid storage part that recovers the printing liquids fired from the recording head during a non-printing period in order to maintain the recording head and stores the printing liquids,
wherein the liquid storage part includes a liquid absorber for inkjet liquid storage, the absorber being able to store the at least one liquid fired from the nozzles,
wherein a mixture including at least one of the first printing liquid(s) and at least one of the second printing liquid(s) discharged from the recording head during the non-printing period is stored in the liquid storage part, and
wherein the liquid absorber contains a coagulation-thickening preventing agent which is present in the absorber before the mixture enters the absorber and which prevents the reaction of the metal ion with the anionic compound, the agent being contained in a state which allows the agent to mix with the mixture.

3. The inkjet liquid storage tank according to claim 1, wherein the coagulation-thickening preventing agent is a chelating agent that chelates the metal ion or a masking agent that masks the metal ion and protects the metal ion from the anionic compound.

4. The inkjet liquid storage tank according to claim 1, wherein the coagulation-thickening preventing agent is at least one selected from the group consisting of nitrilotriacetic acid, N,N-(2-hydroxyethyl)-glycine, ethylenediamine-N,N,N', N'-tetraacetic acid, dicarboxylic acids, tricarboxylic acids, phosphoric acid and salts thereof.

5. The inkjet liquid storage tank according to claim 4, wherein the dicarboxylic acids and the salts thereof are at least one selected from tartaric acids including tartaric acid, potassium tartrate and sodium potassium tartrate, and the tricarboxylic acids and the salts thereof are at least one selected from citric acids including citric acid, lithium citrate, potassium citrate, potassium dihydrogen citrate, sodium citrate, disodium hydrogen citrate and triammonium citrate.

6. The inkjet liquid storage tank according to claim 3, wherein the coagulation-thickening preventing agent is used in a form of a solution in a liquid including a non-volatile organic solvent and water.

7. The inkjet liquid storage tank according to claim 6, wherein the coagulation-thickening preventing agent comprises a surfactant.

8. The inkjet liquid storage tank according to claim 7, wherein the non-volatile organic solvent is at least one selected from the group consisting of poly-hydric alcohols and glycol ethers.

9. The inkjet liquid storage tank according to claim 1, wherein the content of the polyvalent metal ion included in the first printing liquid is 100 ppm or higher.

10. The inkjet liquid storage tank according to claim 1, wherein the content of the polyvalent metal ion included in the first printing liquid is 500 ppm or higher.

11. The liquid absorber according to claim 2, wherein the coagulation-thickening preventing agent is at least one selected from the group consisting of nitrilotriacetic acid, N,N-(2-hydroxyethyl)-glycine, ethylenediamine-N,N,N',N'-tetraacetic acid, dicarboxylic acids, tricarboxylic acids, phosphoric acid and salts thereof.

12. The liquid absorber according to claim 11, wherein the dicarboxylic acids and the salts thereof are at least one selected from tartaric acids including tartaric acid, potassium tartrate and sodium potassium tartrate, and the tricarboxylic acids and the salts thereof are at least one selected from citric acids including citric acid, lithium citrate, potassium citrate, potassium dihydrogen citrate, sodium citrate, disodium hydrogen citrate and triammonium citrate.

13. The liquid absorber according to claim 2, wherein the content of the polyvalent metal ion included in the first printing liquid is 100 ppm or higher.

14. The liquid absorber according to claim 2, wherein the content of the polyvalent metal ion included in the first printing liquid is 500 ppm or higher.

* * * * *